(12) United States Patent
Hayworth et al.

(10) Patent No.: US 10,202,835 B2
(45) Date of Patent: Feb. 12, 2019

(54) PRESSURE DELIVERY PROPPANT TO OFFSHORE FRAC BLENDER

(71) Applicant: Halliburton Energy Services, Inc., Houston, TX (US)

(72) Inventors: Robert Douglas Hayworth, Chickasha, OK (US); Paul Lynn Armstrong, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 78 days.

(21) Appl. No.: 15/102,318

(22) PCT Filed: Jan. 16, 2014

(86) PCT No.: PCT/US2014/011901
§ 371 (c)(1),
(2) Date: Jun. 7, 2016

(87) PCT Pub. No.: WO2015/108523
PCT Pub. Date: Jul. 23, 2015

(65) Prior Publication Data
US 2016/0319648 A1    Nov. 3, 2016

(51) Int. Cl.
*B65G 53/12* (2006.01)
*E21B 43/26* (2006.01)
*E21B 43/267* (2006.01)
*B65G 53/04* (2006.01)
*B65G 53/66* (2006.01)

(52) U.S. Cl.
CPC .............. *E21B 43/26* (2013.01); *B65G 53/04* (2013.01); *B65G 53/66* (2013.01); *E21B 43/267* (2013.01)

(58) Field of Classification Search
CPC ........ B65G 53/66; B65G 53/12; E21B 43/267
USPC .............. 406/23, 31, 32, 127, 128, 146
See application file for complete search history.

(56) References Cited

U.S. PATENT DOCUMENTS

| 3,638,328 A * | 2/1972 | Solt ................. B01J 8/0035 34/369 |
| 4,427,133 A | 1/1984 | Kierbow et al. |
| 4,716,932 A | 1/1988 | Adams, Jr. |
| 5,485,812 A * | 1/1996 | Firey ................. F02B 45/00 110/108 |
| 5,775,803 A * | 7/1998 | Montgomery ......... G05D 21/02 366/152.2 |
| 6,447,215 B1 * | 9/2002 | Wellmar ............... B65G 53/66 406/11 |
| 6,949,491 B2 | 9/2005 | Cooke, Jr. |

(Continued)

OTHER PUBLICATIONS

International Preliminary Report on Patentability issued in related Application No. PCT/US2014/011901, dated Jul. 28, 2016 (10 pages).

(Continued)

*Primary Examiner* — Joseph A Dillon, Jr.
(74) *Attorney, Agent, or Firm* — John Wustenberg; Baker Botts L.L.P.

(57) ABSTRACT

A system for using a pneumatic conveyor system to provide metered amounts of proppant to subterranean formation fracturing material blender in an offshore well environment. Plural pneumatic conveyor systems are provided which can be operated individually or in combination to provide the required amounts of proppant materials to blend with frac fluids.

8 Claims, 4 Drawing Sheets

(56) References Cited

U.S. PATENT DOCUMENTS

| | | | |
|---|---|---|---|
| 8,464,971 B1 | 6/2013 | Munisteri | |
| 2004/0251345 A1* | 12/2004 | Graham | B02C 19/06 |
| | | | 241/47 |
| 2005/0062191 A1* | 3/2005 | Kurashige | B29B 7/7495 |
| | | | 264/140 |
| 2006/0065766 A1* | 3/2006 | Graham | B02C 19/06 |
| | | | 241/5 |
| 2008/0066911 A1* | 3/2008 | Luharuka | E21B 43/267 |
| | | | 166/283 |
| 2008/0135072 A1* | 6/2008 | Bold | B01F 9/0007 |
| | | | 134/104.1 |
| 2013/0213647 A1 | 8/2013 | Roddy et al. | |
| 2013/0269735 A1* | 10/2013 | Roetzel | E21B 21/062 |
| | | | 134/40 |
| 2014/0072506 A1* | 3/2014 | Pech | C09C 1/482 |
| | | | 423/449.6 |
| 2015/0300737 A1* | 10/2015 | Maguire | B01F 15/00805 |
| | | | 34/507 |

OTHER PUBLICATIONS

International Search Report and Written Opinion issued in related PCT Application No. PCT/US2014/011901 dated Oct. 27, 2014, 13 pages.

* cited by examiner

PRESSURE DELIVERY PROPPANT TO OFFSHORE FRAC BLENDER

CROSS-REFERENCE TO RELATED APPLICATION

The present application is a U.S. National Stage Application of International Application No. PCT/US2014/011901 filed Jan. 16, 2014, which is incorporated herein by reference in its entirety for all purposes.

DESCRIPTION

Technical Field

A system and method for delivering metered amounts of proppant to subterranean formation fracturing material blender in and offshore well environment.

Background

The process of enhancing hydrocarbon well production includes the process of formation fracturing a/k/a fracing. In this process, solid particulate material, generically referred to as proppant, is blended with fluid chemicals at the well site in a frac blender to form a solid-fluid mixture that is injected into a well at high pressures to cause the subterranean formation to fracture to enhance hydrocarbon production.

Proppant used in frac process includes various materials, for example: coated and uncoated sand, glass, plastic, etc. of various screen sizes. The size, material, and amount of proppant that is blended with frac fluids is designed to optimize the fracturing process. Delivering to a frac blender fixed metered amounts of flowing proppants of a variety of particle sizes, having different coatings and with varying moisture content is complicated by.

In the offshore environment, floating vessels, such as, ships and dumb barges are used to transport the particulate frac materials to the well. In the limited space available on these vessels, proppant and frac fluid material storing, conveying and mixing equipment must be present to supply fracing material blends to the well.

The vessel mounted fracing material storing and mixing equipment must be able to handle and accurately blend the variety of materials used in the fracing process. It will, thus, be appreciated that it is desirable to have fracing material storing and mixing equipment that function in the offshore environment.

BRIEF DESCRIPTION OF THE DRAWINGS

The drawing is incorporated into and forms a part of the specification to illustrate at least one embodiment and example of the present design. Together with the written description, the drawing serves to explain the principles of the present design. The drawing is only for the purpose of illustrating at least one preferred example of at least one embodiment of the present design and is not to be construed as limiting the present design to only the illustrated and described example or examples. The various advantages and features of the various embodiments of the present design will be apparent from a consideration of the drawing in which.

DETAILED DESCRIPTION

The present design provides an improved system for supplying proppant from a vessel to fracing equipment at an offshore well.

It is to be understood that the various embodiments described herein are described merely as examples of useful applications of the principles of the disclosure, which is not limited to any specific details of these embodiments.

Figure 1:
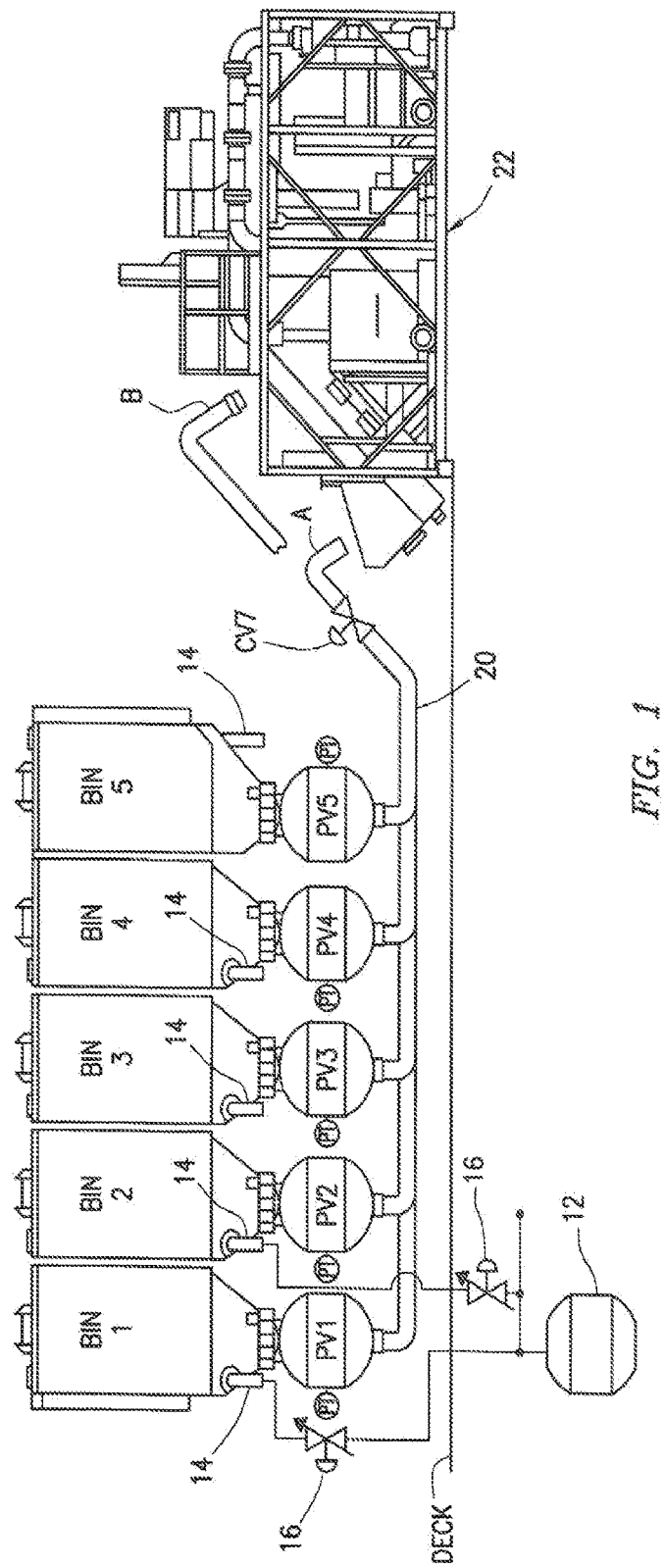
FIG. 1 is a diagram illustrating a vessel mounted proppant material storage, metering and delivery system for use in fracing an offshore well.

Representatively illustrated in FIG. 1, are proppant material temporary storage, metering and delivery systems for use in fracing an offshore well generally identified by reference numeral 10. In this embodiment, the system 10 comprises a below vessel deck mounted bulk material tank 12 for storing proppant and a plurality of intermediate storage bins identified as Bins 1-5. In use, more or less intermediate bins may be present, but for description purposes only five bins are illustrated. Bins 1-5 comprise gravity feed bins each with an input supply port 14 connected by conduits to receive proppant from bulk tank 12.

Pneumatically operated flow control valves 16 are present to control the flow of proppant from the bulk tank 12 into the intermediate storage Bins 1-5. The pneumatically operated flow control valve 16 and the other pneumatically operated flow control valves, contained in system 10, include on-off valves and those that are proportional and vary in degree the valve opening between the fully open and fully closed states. As will be described, most of the control valves included in the system 10 are proportionally controlled based on feedback supplied to a controller.

In FIG. 1, for simplicity, only the conduits and valves 16 for supplying Bins 1 and 2 are included in the illustration. The plumbing for the remaining Bins 3-5, although not illustrated, would be identical. By selectively controlling valves 16, the individual intermediate storage Bins 1-5 can be filled with proppant materials as required. As will be described in more detail, feedback for controlling valves 16 is in part provided by sensors measuring the volume (weight) of proppant material contained in the Bins.

In the system depicted in FIG. 1, each of the Bins 1-5 is mounted to gravity feed proppant material, respectively, into individual pressure vessels PV1-5. Material is discharged from pressure vessels PV1-5 into a manifold 20. Manifold 20 can be plumbed to alternatively feed proppant material at either points A or B to a conventional frac blender 22. Pneumatically operated flow control valves CV7 can be connected in manifold 20 to provide control of the supply of proppant to blender 22. In the blender 22 proppant is combined with frac fluid and ultimately pumped into the well during fracing operations. Discharge at point A is into a sand hopper on the frac blender 22 and discharge at point B feeds proppant directly into the blender tub 24 of the frac blender.

Figure 2:
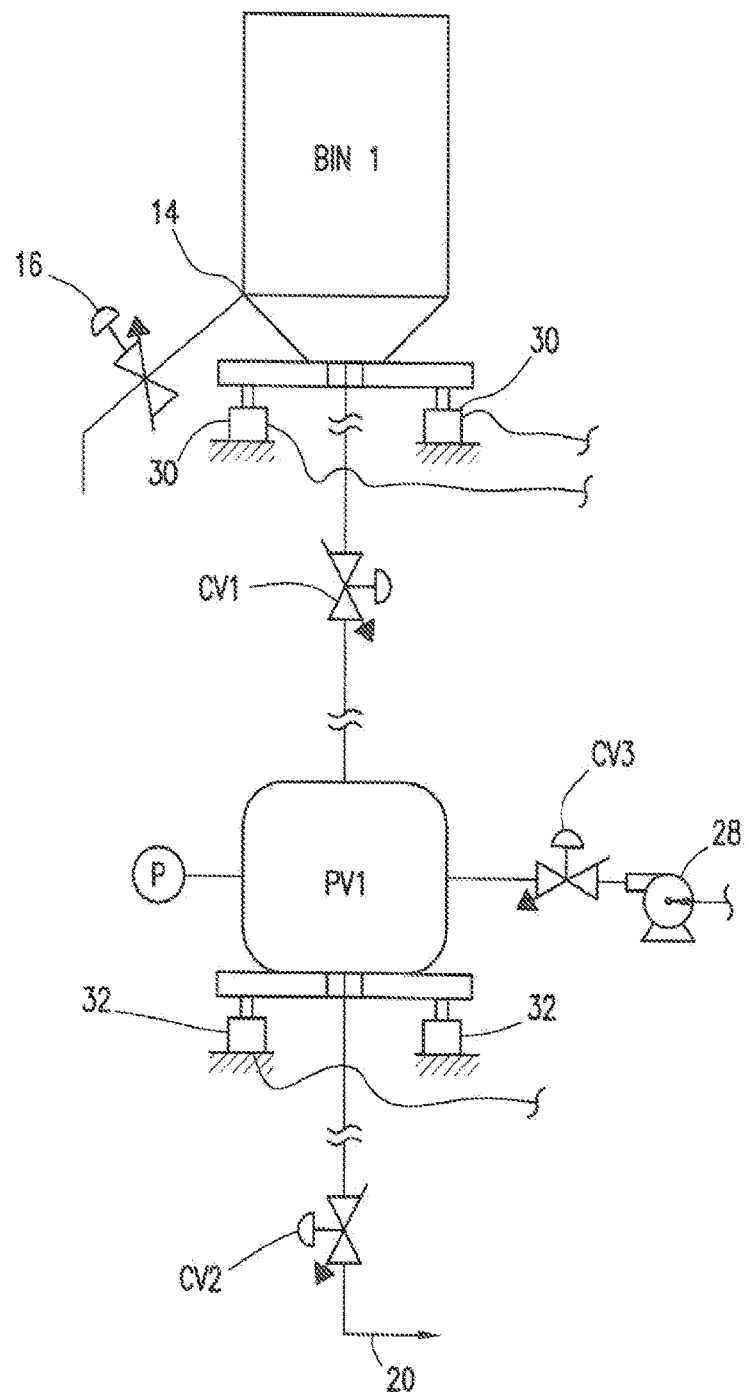
FIG. 2 is schematic of an example of a flow volume control for use in the proppant material temporary storage, metering and delivery systems for use in fracing an offshore well.

In FIG. 2, a typical flow diagram for each of the bins is illustrated by reference to Bin 1. A pneumatically operated proportional control valve CV1 is mounted to control the flow of proppant from Bin 1 to pressure vessel PV1. A second pneumatically operated proportional control valve CV2 is mounted to control the flow of proppant from PV1 into manifold 20. A third pneumatically operated control valve CV3 is positioned to control flow of a fluid (air) under pressure into pressure vessel PV1 as supplied from pump 28.

As previously described Bin 1 has apparatus for measuring the amount of materials contained therein. For example, the supports for Bin 1 are fitted with strain gage sensors 30 used to generate feedback signals corresponding to the amount (weight) of the material in the bins. In a similar manner, the supports for pressure vessel PV1 are fitted strain gauges 32 to generate a feedback signal indicative of the amount of material in PV1. It is envisioned, that other means for measuring the volume of material contained in the bins and in the vessels could be used.

To utilize the system illustrated in FIG. 2, when the feedback signal generated using strain gauges 30 indicate that Bin 1 requires additional proppant material, Bin 1 can be filled by opening the valve 16 and pneumatically pumping proppant from the bulk tank 12 into the Bin 1 through inlet 14. When the feedback signal generated by strain gauges 32 indicates that pressure vessel PV1 requires that proppant material be added, then when control valves CV2 and CV3 are closed, control valve CV1 is opened to add proppant material. When the feedback signal from strain gauges 32 indicate that pressure vessel PV1 contains an adequate supply of proppant material, control valve CV1 is closed and control valve CV3 is opened to supply air under pressure into pressure vessel. When pressure vessel PV1 contains proppant material and is connected to pump 28, metering control valve CV2 can be proportionally opened to pneumatically pump proppant into the manifold 20 to be transported to the frac blender 22.

By sensing the rate of change in weight in pressure vessel PV1 the rate at which proppant is being pumped into the manifold 20 can be determined. By regulating the opening of control valve CV2 the rate at which proppant is being pumped into the manifold 20 from pressure vessel PV1 can be controlled. Metering of the rate of supply of proppant to the frac blender is accomplished by monitoring the change in weight of the pressure vessel(s) supplying proppant to the manifold 20 and regulating the proportional control valves. By a simple algorithm, the rate of weight change in the pressure vessel(s) can be calculated to determine the proppant supply rate. By manipulating control valves CV2 the rate of material supply to the frac blender can be regulated.

A plurality of the pressure vessels systems illustrated in FIG. 1 could be operated simultaneously to supply proppant into manifold 20 at regulated rates in excess of that which could be provided by a single pressure vessel system. In a similar manner the total flow rate of proppant material from all of the pressure vessels to the frac blender 22 can be regulated. Alternatively, the pressure vessel systems could be operated, one at a time to provide a continuous supply of proppant at a set rate. For example, system A could be supplying proppant to manifold 20, while PV2 of system B is being filled with proppant from bulk tank 12. When PV1 of system A is depleted of proppant, system be could be actuated to supply of proppant to manifold 12. Thus by alternating proppant discharge from one or more of the pressure vessels PV1-5 an uninterrupted and set rate of proppant could be supplied to the frac blender.

Figure 3:
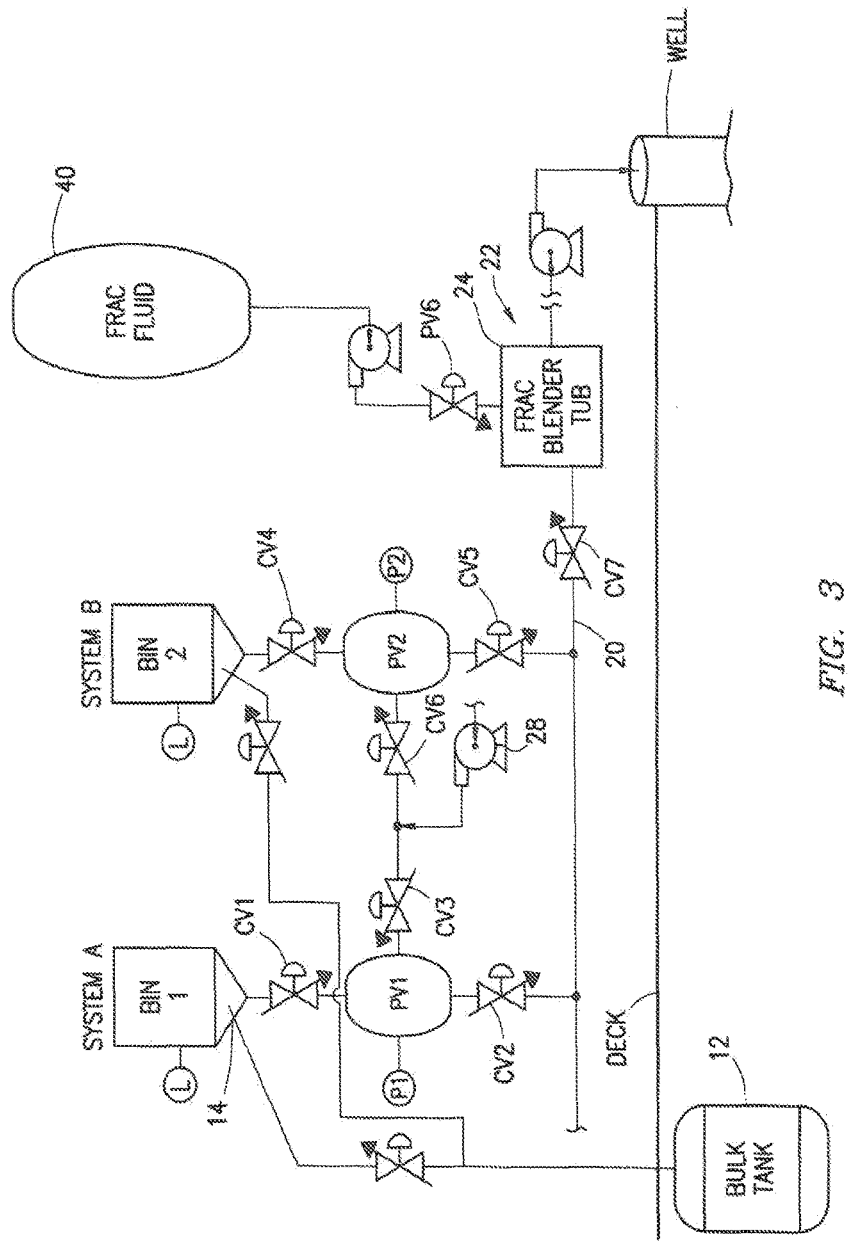
FIG. 3 is a piping diagram illustrating two supply bin circuits of the proppant material temporary storage, metering and delivery systems for use in fracing an offshore well.

By referring to FIG. 3, the cooperation between multiple bin-pressure vessel systems to provide a continuous metered supply of proppant material will be described. In this figure, the Bin1-PV1 system is identified as System A, while the Bin2-PV2 system is identified as System B. While the material in pressure vessel PV1 is supplying material to manifold 20, proppant material can be supplied simultaneously or serially to Bins 1 and 2. While pressure vessel PV1 is supplying material to manifold 20, pressure vessel PV2 can be isolated from the manifold by closing the valve CV5 and filled with proppant material from Bin 2 by opening the valve CV4. Conversely while pressure vessel PV2 is supplying material to manifold 20, pressure vessel PV1 can supplied with material from Bin1. Depending of the volumes required one or more of the individual bin-pressure vessel systems can operate in sequence.

Figure 4:
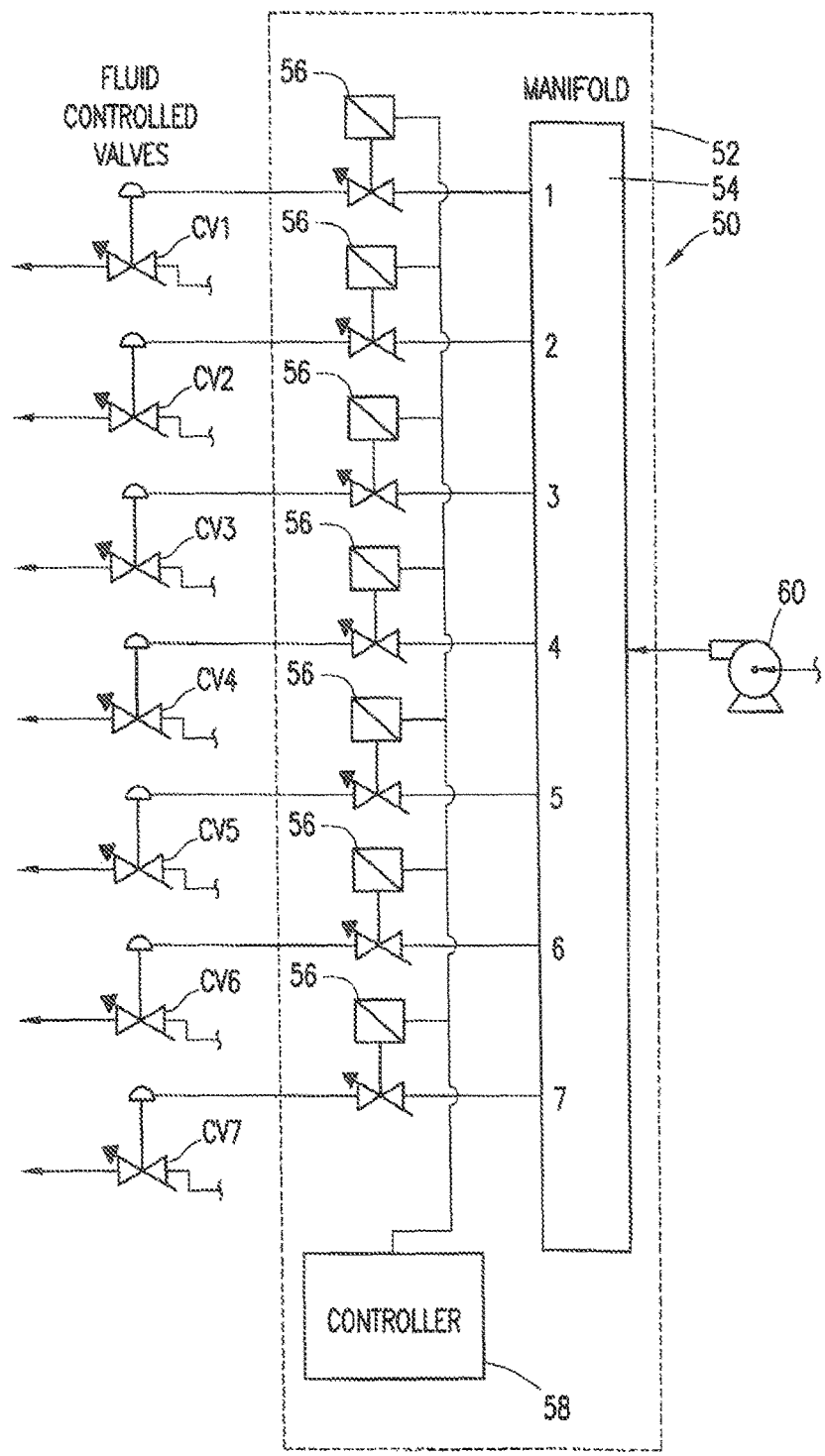
FIG. 4 is a schematic of an exemplary control system for the supply bin circuits illustrated in FIG. 2.

FIG. 4 illustrates a schematic of an example of a control circuit 50 for system 10. Control circuit 50 comprises a pneumatic supply 60, a manifold 54 and a computer controller 58. In the current embodiment the pneumatic supply 60 comprises a pump; however, control circuit 50 could be connected to a vessel mounted air pressure source. Alternatively, a hydraulic system could be substituted for the pneumatic system. Control circuit 54 further comprises a plurality of solenoid actuated control valves 56 each of which is connected between manifold 54 and one of the pneumatic proportional control valves CV1-7. Preferably the solenoid actuated control valves 66 are enclosed within a cabinet 70 along with the other electrical components of the control circuit 50. Additionally, the outputs from the strain gauges 30 and 32 are operably associated with the controller to provide feedback signals for operating the various valves of the system 10.

Controller 58 comprises a computer, an input device (such as a keyboard), a display (such as a monitor) and computer controlled devices. The computer is of the type that has memory and a processor that can be programmed to carry out a set of arithmetic or logical operations. The computer controlled devices comprises devices connected to the computer system and controlled by the processor, such as valves 56. By mounting the solenoid actuated control valves 56 in the air supply line connected to control valves CV1-7, the control valves CV1-7 can be independently operated by the controller.

In operation, the desired or set rate of proppant supply and unit weight of the proppant material can be stored in the controller. The controller 58 can be programmed to operate the various control valves CV1-7 with feedback signal from the strain gauges, to provide a regulated amount of proppant material from one or more of the pressure vessels to the frac blender 22. Additionally, the controller can be programmed to provide proppant supply to the Bins from supply tank 12 based on the feedback signals from the strain gauges. Further, the controller can be programmed to perform any of the tasks described herein.

While compositions and methods are described in terms of "comprising," "containing," or "including" various components or steps, the compositions and methods also can "consist essentially of" or "consist of" the various components and steps. As used herein, the words "comprise," "have," "include," and all grammatical variations thereof are each intended to have an open, non-limiting meaning that does not exclude additional elements or steps.

Therefore, the present designs are well adapted to carry out the objects and attain the ends and advantages mentioned as well as those which are inherent therein. While the invention has been depicted, described, and is defined by reference to exemplary embodiments of the inventions, such a reference does not imply a limitation on the inventions, and no such limitation is to be inferred. The inventions are capable of considerable modification, alteration, and equivalents in form and function, as will occur to those ordinarily skilled in the pertinent arts and having the benefit of this disclosure. The depicted and described embodiments of the inventions are exemplary only, and are not exhaustive of the scope of the inventions. Consequently, the inventions are intended to be limited only by the spirit and scope of the appended claims, giving full cognizance to equivalents in all respects.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A method of providing proppant to a fracturing material blender at a set flow rate, the method comprising:
   providing a vessel with a valve to regulate flow of proppant from the vessel to the blender, wherein the vessel is a pressure vessel;
   inserting proppant material from a first conduit into the vessel;
   supplying fluid under pressure to the vessel via a second conduit;
   opening the valve to flow proppant to the blender;
   measuring the amount of proppant contained in the vessel as a function of lapsed time;
   utilizing the change in proppant amount and lapsed time to determine a proppant flow rate; and
   adjusting the valve to maintain the set flow rate;
   wherein the step of providing a pressure vessel comprises providing a plurality of pressure vessels, each vessel having a separate valve to regulate flow of proppant from the vessel to the blender;
   wherein the measuring step comprises determining the amount of proppant in a vessel and additionally comprising closing the valve to stop proppant flow from the vessel when the amount of proppant falls below a set amount;
   inserting proppant material into the vessel after the amount of proppant falls below a set amount; and
   wherein the step of opening the valve to flow proppant to the blender comprises adjusting the valve on one vessel to maintain the set flow rate from that vessel and simultaneously inserting proppant material into another vessel while the valve on that vessel is closed.

2. The method according to claim 1, wherein the step of measuring the change in proppant amount comprises continuously weighing the vessel and its contents via a strain gauge.

3. The method according to claim 1, wherein the step of providing a pressure vessel with a valve comprises supplying a valve to regulate flow and to selectively prevent flow from the vessel.

4. The method according to claim 1, wherein the step of flowing proppant to the blender comprises flowing proppant from one vessel at a time.

5. The method of claim 1, further comprising measuring the amount of proppant contained in the vessel as a function of lapsed time while pumping the fluid into the vessel.

6. The method of claim 1, wherein supplying fluid under pressure to the vessel comprises pumping the fluid into the pressure vessel via a pump.

7. The method of claim 1, wherein supplying fluid under pressure to the vessel further comprises opening a second valve on the second conduit between the pressure vessel and a pump.

8. The method of claim 7, further comprising:
   maintaining the valve in a closed position when inserting proppant into the pressure vessel;
   inserting the proppant from a bin into the pressure vessel by opening a third valve located on the first conduit between the bin and the pressure vessel;
   supplying the fluid under pressure to the pressure vessel after closing the third valve; and
   metering the valve to pump proppant from the pressure vessel into the manifold while still supplying the fluid under pressure to the pressure vessel.

* * * * *